United States Patent
Chauhan et al.

(10) Patent No.: US 11,907,928 B2
(45) Date of Patent: Feb. 20, 2024

(54) METHODS, DEVICES, AND SYSTEMS FOR MOBILE DEVICE OPERATIONS DURING TELEPHONE CALLS

(71) Applicant: Bank of America Corporation, Charlotte, NC (US)

(72) Inventors: Sandeep Kumar Chauhan, Hyderabad (IN); Udaya Kumar Raju Ratnakaram, Hyderabad (IN); Geetika Lal, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/895,420

(22) Filed: Jun. 8, 2020

(65) Prior Publication Data
US 2021/0383351 A1    Dec. 9, 2021

(51) Int. Cl.
*G06Q 20/32*    (2012.01)
*G10L 15/08*    (2006.01)

(52) U.S. Cl.
CPC ....... *G06Q 20/3223* (2013.01); *G06Q 20/327* (2013.01); *G06Q 20/3227* (2013.01); *G10L 15/08* (2013.01); *G10L 2015/088* (2013.01)

(58) Field of Classification Search
CPC ........... G06Q 20/3223; G06Q 20/3227; G06Q 20/327; G10L 15/08; G10L 2015/088
USPC .......................................................... 705/44
See application file for complete search history.

(56) References Cited

U.S. PATENT DOCUMENTS

| | | | |
|---|---|---|---|
| 6,519,571 B1 | 2/2003 | Guheen et al. | |
| 7,693,771 B1 | 4/2010 | Zimmerman et al. | |
| 8,275,119 B2 | 9/2012 | Kahn | |
| 10,074,089 B1 | 9/2018 | Rangaraj et al. | |
| 10,438,205 B2 | 10/2019 | Van Os et al. | |
| 10,958,784 B1 | 3/2021 | Way et al. | |
| 11,106,515 B1 | 8/2021 | Fakhraie et al. | |
| 2004/0059672 A1 | 3/2004 | Baig et al. | |
| 2010/0274563 A1* | 10/2010 | Malo | H04M 1/0202 704/E15.04 |

(Continued)

FOREIGN PATENT DOCUMENTS

| | | | | |
|---|---|---|---|---|
| CA | 2701431 A1 * | 10/2010 | ........... | G06F 3/0482 |
| JP | 2020166644 A | 10/2020 | | |
| KR | 100639906 B1 * | 10/2006 | | |

OTHER PUBLICATIONS

"An empirical examination of factors influencing the intention to use mobile payment," by Changsu Kim; Mirsobit Mirusmonov; and In Lee. Computers in Human Behavior 26 (2010). pp. 310-322. (Year: 2010).*

(Continued)

*Primary Examiner* — Sara C Hamilton

(74) *Attorney, Agent, or Firm* — Banner & Witcoff, Ltd.

(57) ABSTRACT

Aspects of the disclosure relate to mobile device operations during an ongoing call. The mobile device operations may relate to payment processing operations. The mobile device may determine contact information associated with a party in an ongoing call. The mobile device may determine, based on the contact information, information associated with a payment transaction request. The mobile device may send, based on the determined information the payment transaction request. The mobile device may dynamically determine a user interface to be displayed during the call to facilitate the various mobile device operations.

16 Claims, 11 Drawing Sheets

(56) References Cited

U.S. PATENT DOCUMENTS

| | | | |
|---|---|---|---|
| 2011/0106736 A1 | 5/2011 | Aharonson et al. | |
| 2013/0159170 A1* | 6/2013 | Gandhi | G06Q 20/3267 |
| | | | 705/39 |
| 2015/0324900 A1 | 11/2015 | Starikova et al. | |
| 2016/0162905 A1* | 6/2016 | Singh | G06Q 30/016 |
| | | | 705/304 |
| 2017/0255974 A1 | 9/2017 | Kulkarni | |
| 2017/0289305 A1 | 10/2017 | Liensberger et al. | |
| 2018/0089658 A1 | 3/2018 | Bell et al. | |
| 2018/0096302 A1 | 4/2018 | Tseretopoulos et al. | |
| 2018/0097905 A1 | 4/2018 | Todasco et al. | |
| 2018/0114127 A1 | 4/2018 | Cole et al. | |
| 2018/0217728 A1 | 8/2018 | Liu et al. | |
| 2018/0335928 A1 | 11/2018 | Van Os et al. | |
| 2019/0075506 A1 | 3/2019 | Coglon et al. | |
| 2019/0172117 A1 | 6/2019 | Sharma et al. | |
| 2019/0251543 A1 | 8/2019 | Gandhi et al. | |
| 2019/0371331 A1* | 12/2019 | Schramm | H04M 3/42263 |
| 2019/0387097 A1* | 12/2019 | Li | H04M 1/72469 |
| 2020/0175962 A1* | 6/2020 | Thomson | G10L 15/183 |
| 2020/0211065 A1 | 7/2020 | Govindarajalu et al. | |
| 2021/0051136 A1* | 2/2021 | Critchley | H04W 12/02 |
| 2021/0084150 A1* | 3/2021 | Nagy | H04M 1/72469 |

OTHER PUBLICATIONS

Mar. 16, 2022—(U.S.) Non-Final Office Action—U.S. Appl. No. 16/895,286.
Sep. 29, 2022—(U.S.) Final Office Action—U.S. Appl. No. 16/895,286.
Aug. 14, 2023—(U.S.) Non-Final Office Action—U.S. Appl. No. 16/895,286.

* cited by examiner

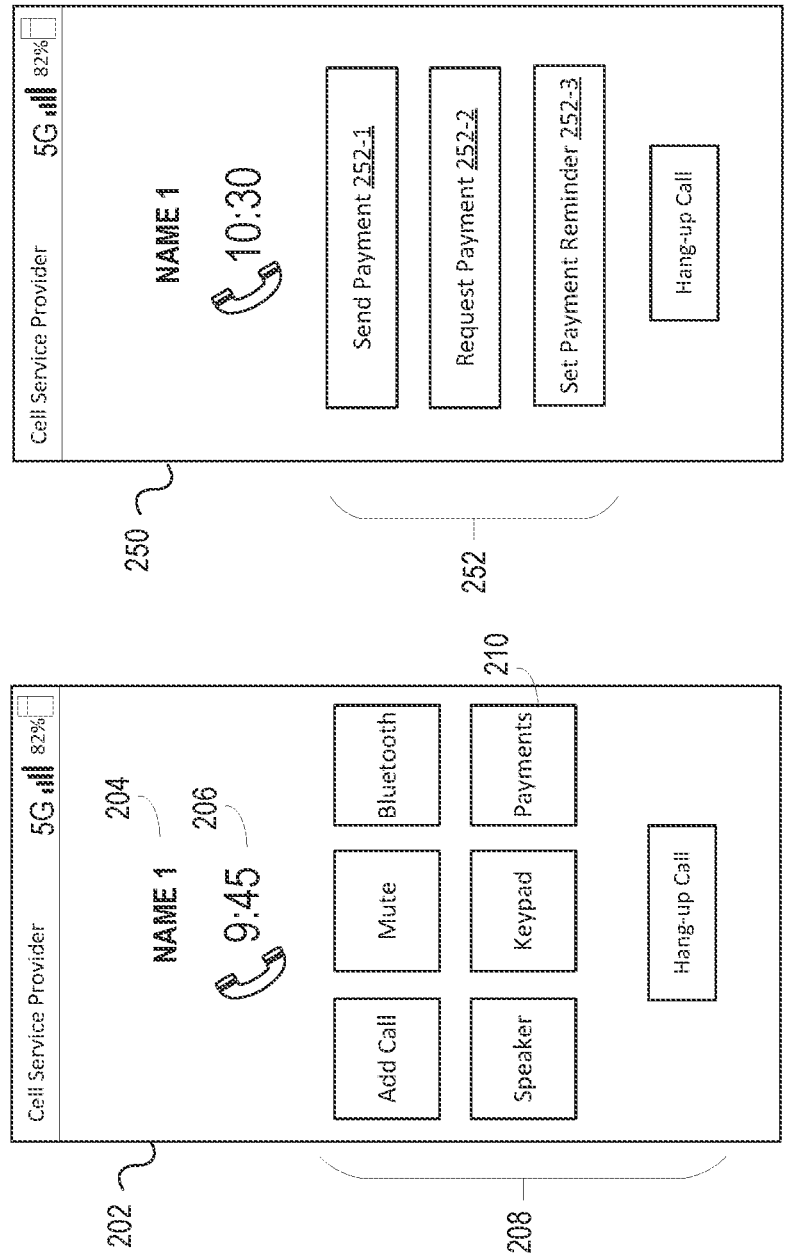

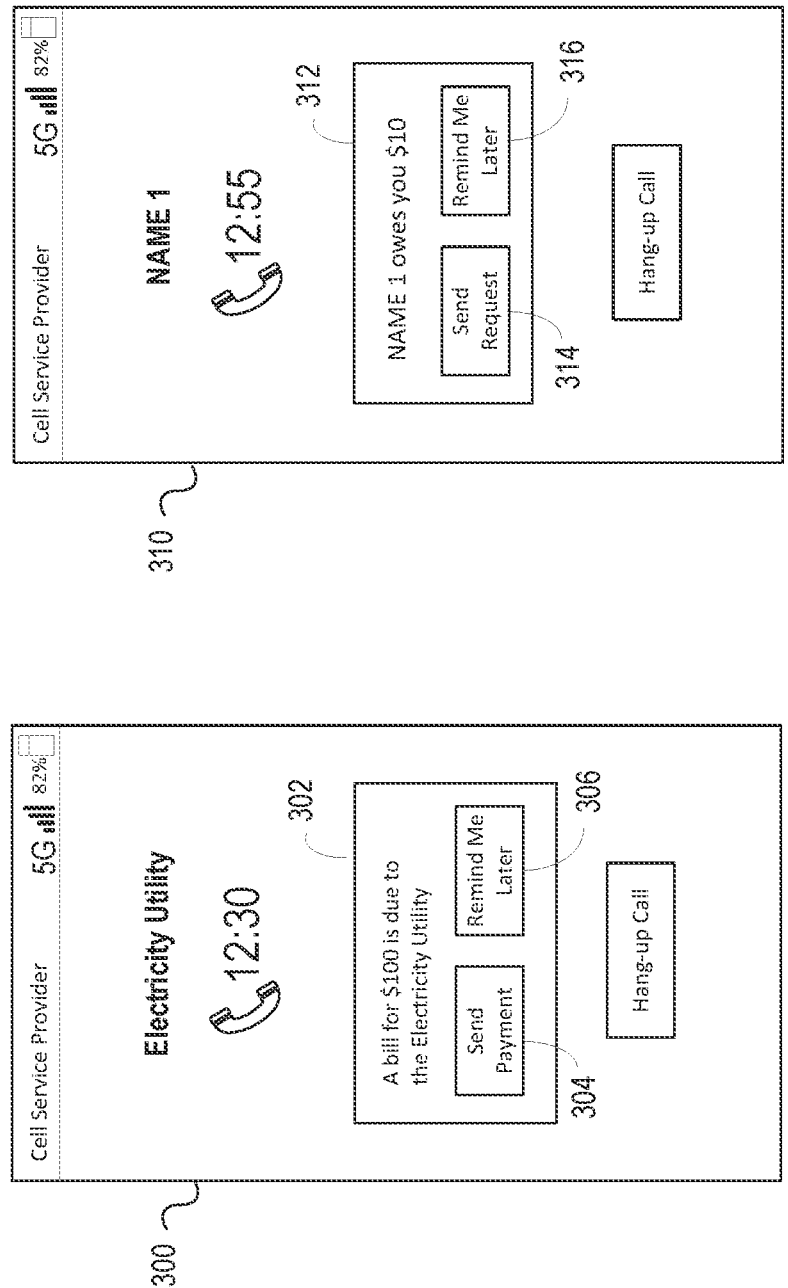

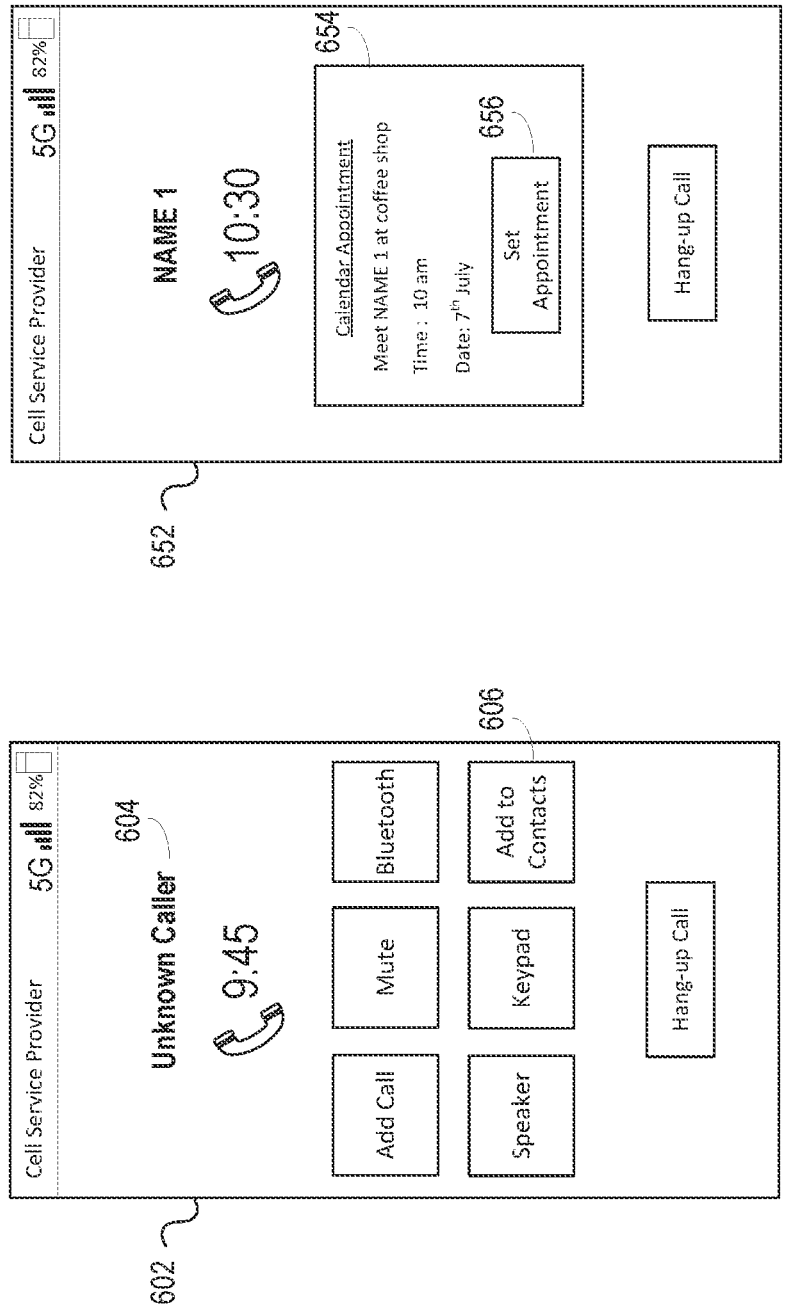

METHODS, DEVICES, AND SYSTEMS FOR MOBILE DEVICE OPERATIONS DURING TELEPHONE CALLS

TECHNICAL FIELD

Aspects described herein generally relate to technologies for facilitating mobile device operations during telephone calls, and more specifically to technologies for smart rendering of on-screen keyboards and initiating payment transactions.

BACKGROUND

Mobile computing devices (such as smartphones, tablet computers, laptop computers, etc.) may be equipped with touch-sensitive display screens that may be used to provide input. Virtual buttons may be rendered on a display screen and an input may be provided by a user selecting the rendered button. For example, a smartphone may render a virtual keyboard during an ongoing call. The virtual keyboard may be used, for example, to input call commands (e.g., hang-up a call, mute a call), input numbers, connect to another device, activate speakerphone, etc.

Electronic payments may be initiated by a user via the mobile computing device. Initiating payments may require a user to manually access a payment portal (e.g., an application, or a web interface) and enter payment details. This may interrupt other activities that the user may be currently performing on the computing device. For example, the user may be on a call and initiating the payment may require the user to exit/hold the call, access the payment portal, and input payment details.

SUMMARY

Aspects of the disclosure provide solutions that address and overcome technical problems associated with initiating transactions during an ongoing user activity at a computing device. In particular, one or more aspects of the disclosure relate to displaying virtual keyboards and enabling payment transactions during an ongoing telephone call.

In accordance with one or more arrangements, a payment processing system may comprise a mobile device, associated with a first user, and a payment server. The mobile device may comprise at least one first processor, a first communication interface communicatively coupled to the at least one first processor, and a first memory storing first computer-readable instructions that, when executed by the at least one first processor, cause the mobile device to perform one or more steps. For example, the mobile device may determine, during an ongoing call with a second user, a call context associated with the call. The mobile device may determine, based on the call context, virtual keyboard buttons to display on a display screen associated with the mobile device, and display the virtual keyboard buttons. The mobile device may determine a user input, via the virtual keyboard buttons, to process a payment transaction, and send, via the first communication interface to a payment server, a transaction request to process the payment transaction. The mobile device may receive, from the payment server, a confirmation message indicating that a transaction corresponding to the transaction request has been processed. The payment server may comprise at least one second processor, a second communication interface communicatively coupled to the at least one second processor, and a second memory storing second computer-readable instructions that, when executed by the at least one second processor, cause the payment server to perform one or more steps. For example, the payment server may receive, via the second communication interface, the transaction request.

In some arrangements, the determining the call context may comprise determining keywords in call audio associated with the call. In some arrangements, the determining the call context may comprise determining that the ongoing call corresponds to the payment transaction, and wherein the displaying the virtual keyboard may comprise displaying one or more buttons for the user input to process the payment transaction.

In some arrangements, the mobile device may determine, during an ongoing call with a second user, contact information associated with the second user. The mobile device may further determine, based on the contact information, the transaction request.

In some arrangements, the mobile device may determine, based on the contact information, payment information, wherein the payment information comprises at least one of: source account information, destination account information, and a transaction value. The transaction request may comprise the payment information.

In some arrangements, the mobile device may display, during the call and on the screen, the determined payment information. The sending the transaction request may comprise receiving a user confirmation to send the transaction request.

In some arrangements, the mobile device may determine, based on the contact information, a transaction history between the first user and the second user. The transaction history may comprise transaction values corresponding to prior transactions between the first user and the second user. Further, the mobile device may determine, based on the transaction history, the transaction value.

In some arrangements, the determining the payment information may comprise authenticating the first user based on at least one of: a password; a passcode; a biometric identity; or combinations thereof. In some arrangements, the determining the payment information may comprise analyzing prior communications between the first user and the second user.

BRIEF DESCRIPTION OF THE DRAWINGS

FIGS. 2A and 2B show illustrative graphical user interfaces (GUIs) for initiating a payment transaction during an ongoing call, in accordance with one or more example arrangements;

FIGS. 3A-3D show illustrative GUIs comprising information rendered by the transaction rendering module, in accordance with one or more example arrangements;

FIGS. 6A and 6B shows illustrative GUIs that may be presented during an ongoing call, in accordance with one or more example arrangements;

DETAILED DESCRIPTION

Figure 1:
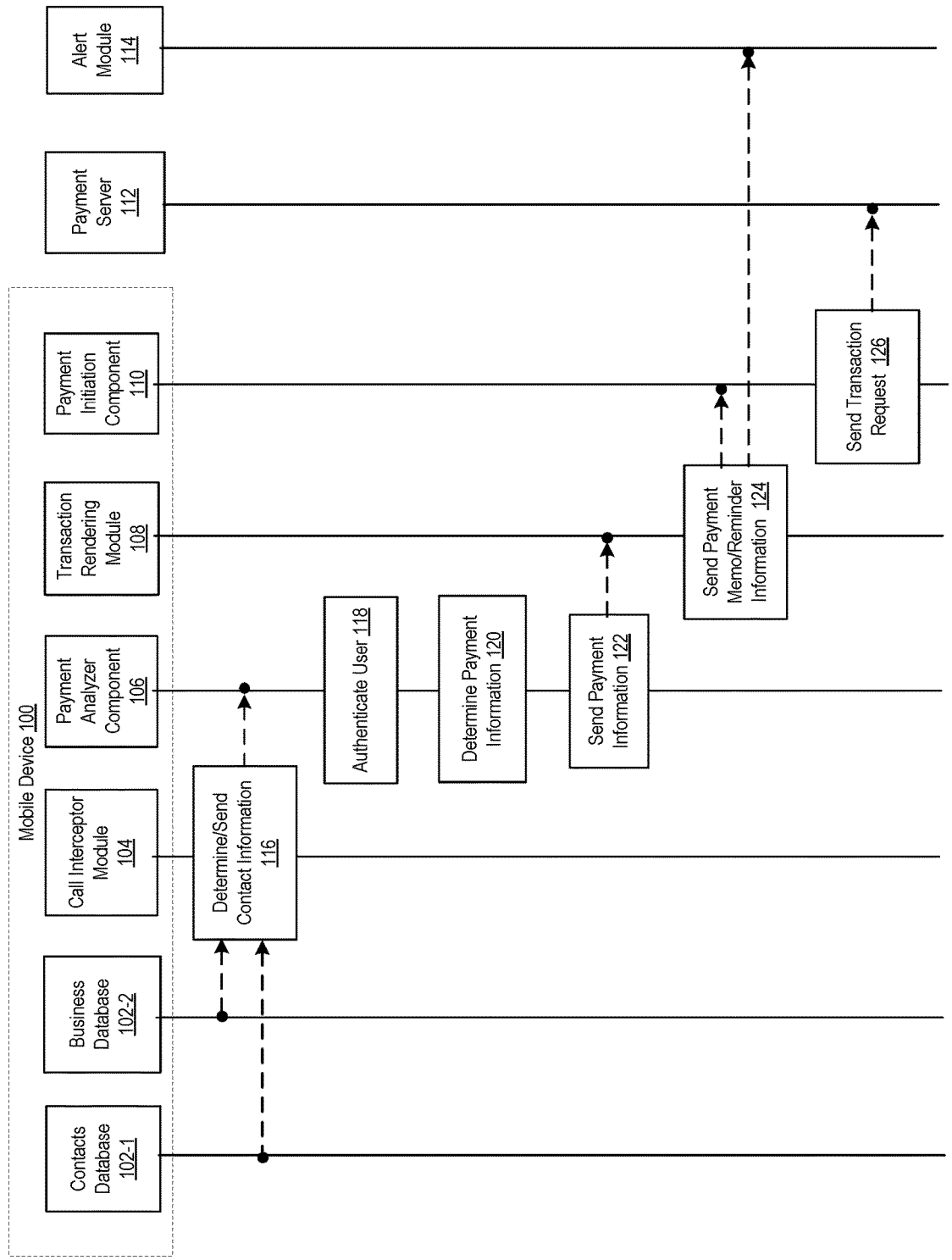
FIG. 1 shows an illustrative event sequence for a payment transaction, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Virtual keyboards/buttons rendered on a display screen associated with a mobile device (e.g., a smartphone, a tablet, a laptop computer, etc.) may be used for various user inputs. For example, during an ongoing call, buttons may be displayed on the screen that may enable a user to input various commands (e.g., start a conference call, mute a microphone, activate a speakerphone, open number pad, etc.). However, the rendered keypad/buttons correspond to only a predefined set of functions. For performing other functions, a user may have to exit/hold the call and access an application corresponding to a desired function. For example, electronic payments may be initiated by the user via a payment processing application and/or a payment portal on the mobile device. Access to the payment portal and/or the application may involve the user manually selecting the application (or a web browser to access the portal) and entering log-in information (e.g., user name and password). Further, to initiate the transaction, the user may have to manually input the transaction details (e.g., a source account, a destination account, and/or a value of funds to be transferred, etc.). Based on this information a payment request may be generated and sent to a payment processor to complete the transaction. If a user is currently on a call, this procedure may be time-consuming, distracting, and non-intuitive.

A mobile device with a smart keyboard module that implements a deeplink virtual keyboard is described. The mobile device may determine, during an ongoing call with a second user, a call context associated with the call. For example, the mobile device may determine keywords in a call audio associated with the ongoing call. The mobile device may determine, based on the call context, virtual keyboard buttons to display on a display screen associated with the smartphone. The mobile device may display, during the ongoing call, the virtual keyboard buttons.

A payment processing system is described. The system may comprise a mobile device, associated with a first user, and a payment server. The mobile device may determine, during an ongoing call with a second user, contact information associated with the second user. Based on the contact information, the mobile device may determine payment information (e.g., one or more of the source account information, the destination account information, and the transaction value). For example, based on the contact information of the second user, the mobile device (e.g., a payment analyzer component of the mobile device) may determine, or retrieve from memory, source account information (e.g., account information corresponding to the first user) and destination account information (e.g., account information corresponding to the second user). The payment analyzer component may determine a transaction value (e.g., value of funds to be transferred).

Based on the payment information, a graphical user interface may be generated (e.g., by a transaction rendering module). The user interface may be displayed on the mobile device during the ongoing call, providing the first user with options for initiating a payment transaction (e.g., options for sending payment, requesting payment, and/or setting a payment reminder). The user interface may be displayed without a user activating a payment processing application. The user interface may further display details (e.g., as determined by the payment analyzer component) corresponding to a payment transaction (e.g., the source account information, the destination account information, the transaction value, etc.) for user confirmation. Based on user confirmation (e.g., via virtual keyboard buttons on the user interface), the mobile device (e.g., a payment initiation component on the mobile device) may send a transaction request to the payment server.

FIG. 1 shows an illustrative event sequence for a payment transaction, in accordance with one or more example arrangements. A mobile device 100 (e.g., a smartphone, tablet, a laptop computer, etc.) may comprise a plurality of modules/components configured to implement various elements of a payment transaction. The modules/components may correspond to routines, programs, objects, components, data structures, and/or other machine-readable instructions that when executed by a processor, associated with the mobile device 100, perform various operations described herein. Operations described with reference to FIG. 1 may be performed during an ongoing telephone call.

At step 116, a call interceptor module 104 on the mobile device 100 may determine, based on an incoming call from (or an outgoing call to) a party, contact information associated with the party. For example, the call interceptor module 104 may determine a cellphone number (e.g., cellphone number or telephone number) associated with the party and access a database 102 to determine, based on the number, contact information associated with the party. The contact information may comprise identifying information (e.g., a name) associated with the party.

The database 102 may comprise names and corresponding numbers of parties that may have been added by a user associated with the mobile device 100 and/or may have been configured by a cellular service provider. The database 102 may comprise one or both of a contacts database 102-1 (e.g., comprising information associated with contacts added by the user) and a business database 102-2 (e.g., comprising information associated with businesses and/or utility companies). The utility companies may be, for example, cable companies, electricity supply companies, gas supply companies, etc.

A payment processing application on the mobile device 100 may comprise a payments directory and a transaction history database. The payments directory may comprise information associated with parties with which the user may initiate payment transactions. The payments directory may comprise, for each party, corresponding one or more of, for example, a name, an email addresses, a cellphone number, a telephone number, a source account number, a destination account number, a routing number, etc. The transaction history database may comprise information associated with previous payment transactions via the payment processing application (e.g., one or more of identifying information associated with a party involved in the transaction, transaction values, transaction dates, etc.).

The user may input a command to initiate a payment transaction with the party. For example, the user may select a button (e.g., on a graphical user interface (GUI) displayed on a touch-sensitive display screen associated with the mobile device 100) corresponding to a request to initiate a payment transaction with the party.

FIG. 2A shows an example GUI 202 for initiating a payment transaction during an ongoing telephone call, in accordance with one or more example arrangements. The GUI 202 may be presented on a display screen of the mobile device 100 during the ongoing telephone call. The GUI 202 may display identifying information 204 associated with a party with which a user is currently on call. The identifying information may comprise contact information determined by the call interceptor module 104. The GUI 202 may further display other call information 206 (e.g., a call timer) and buttons 208 corresponding to various call functions.

The call functions may comprise one or more of: an add call function (e.g., to add another user in a conference call), a mute function (e.g., to mute the call), a Bluetooth function (e.g., to connect a Bluetooth device, such as a headset or an external speaker, with the mobile device 100), a speaker function (e.g., to activate a speakerphone), a keypad function (e.g., to activate a keypad), etc. The buttons 208 may further comprise a payments button 210 which may be used by the user to initiate a payment transaction with a party associated with the call (e.g., "Name 1"). In an arrangement, the payments button 210 may be displayed based on determining that information associated with the party is stored in the database 102. The payments button 210 may be otherwise omitted from the GUI 202.

FIG. 2B shows another example GUI 250 for initiating a payment transaction during an ongoing telephone call, in accordance with one or more example arrangements. The GUI 250 may be displayed on the display screen, for example, if the user selects the payments button 210. The GUI 250 may present buttons 252 for various payment options for initiating a payment transaction. The various payment options may comprise, for example, one or more of sending a payment, requesting a payment, setting a payment reminder, etc. For example, to send a payment to Name 1, the user may select a send payment button 252-2; to request a payment from Name 1, the user may select a request payment button 252-3; and to set a reminder for a future payment transaction, the user may select a set payment reminder button 252-3.

At step 118, a payment analyzer component 106 may authenticate the user. For example, the payment analyzer component 106 may render a prompt, on the display, for the user to input authenticating information. The payment analyzer component 106 may render the prompt based on a user input (e.g., via the payments buttons 210, the send payment button 252-2, or the request payment button 252-2) to initiate a payment transaction. The authenticating information may correspond to a password, a passcode, a fingerprint, eye scan, other biometric identification (e.g., a facial identity), etc. The payment analyzer component 106 may authenticate the user based on inputted authenticating information.

At step 120, the payment analyzer component 106 may determine payment information corresponding to the payment transaction, for example, based on the contact information determined by the call interceptor module 104. The payment analyzer component 106 may determine the payment information using the transaction history database and the payments directory. For example, the payment analyzer component 106 may use the determined contact information corresponding to the party to retrieve information corresponding to the party from the transaction history database and the payments directory. The payment information may comprise one or more of a user name associated with the party, an email address associated with the party, source account number associated with the user, destination account number associated with the party, a routing number associated with a bank, a value of the payment transaction, an indication of whether a payment is owed to the party or whether a payment is being requested from the party, etc.

A predictive caching module may determine at least some aspects of the payment information. In an arrangement, the predictive caching module may determine the payment information based on a transaction history (e.g., retrieved from the transaction history database) between the party and the user. The transaction history may comprise prior payments made to the party, prior payments received from the party, prior payment requests to/from the party, etc. The predictive caching module may determine payment information based on other communications between the party and the user (e.g., messages, emails, etc.).

The predictive caching module may determine if the transaction history indicates periodic payment transactions between the party and the user. For example, the transaction history may indicate that a payment of $1000 is initiated every month from the user to the party. Based on the transaction history, during the call between the user and the party, the predictive caching module may determine that a $1000 payment may be due to the party. The predictive caching module may determine that the value of the payment transaction is $1000.

The predictive caching module may consider a time/day of the call to determine the payment information. For example, the predictive caching module may determine that a $1000 transfer may be due based on determining that the $1000 transfer is initiated between the $1^{st}$ and the $5^{th}$ day of every month, and the call between the party and the user is within that range of days.

Multiple transactions between the user and the party may be tracked and used to determine a value of the payment transaction. For example, the predictive caching module may determine that a payment request for $50 was previously made by the user, and subsequent to it, two payments of $10 each were made by the party to the user. Based on this information, the predictive caching module may determine that an amount is owed to the user and may determine that the value of a payment transaction is $30.

The predictive caching module may determine an outstanding payment request that was sent, by the party, to the user. For example, the predictive caching module may determine that the party had previously sent, to the user, a payment request indicating a request for a payment of $50. Based on this information, the predictive caching module may determine that an amount is owed by the user and may determine that the value of a payment transaction is $50.

The predictive caching module may scan previous communications (e.g., short messaging service (SMS) messages, emails, etc.) between the user and the party to determine the payment information. For example, the predictive caching module may scan for keywords such as "amount due," "bill due," "you owe me," "I owe you," etc. to determine that a payment is due between the user and the party. The predictive caching module may also scan for a value of an amount that may be owed.

For example, an email from a utility company may comprise a text "Amount due: $100." Based on this, during an ongoing call with the utility company, the predictive caching module may determine that an amount is owed by the user, and may determine that a value of the payment transaction is $100. As another example, a text message to a contact may comprise the text "I paid $20 at the restaurant." Based on this, during an ongoing call with the contact, the predictive caching module may determine that an amount is owed by the contact to the user, and may determine that a value of the payment transaction is $20.

At step 122, the payment analyzer component 106 may send the determined payment information to the transaction rendering module 108. The transaction rendering module 108 may render the determined payment information (e.g., one or more of the value of the payment transaction, the source account number, the destination account number, etc.) on the display associated with the mobile device. A user may confirm may confirm the payment transaction by touching an on-screen button. The transaction rendering module 108 may further render one or more prior transactions between the user and the party. The user may be able to edit the rendered payment information on the screen prior to confirmation.

FIG. 3A shows an example GUI 300 comprising information rendered by the transaction rendering module 108, in accordance with one or more example arrangements. The GUI 300 may be displayed, for example, if the user selects the payments button 210 or selects the send payment button 252-1 during an ongoing call. In an example, the GUI 300 may be displayed automatically during the call without any user input. For example, during an ongoing call with an electricity utility company, the predictive caching module may determine (e.g., based on scanning emails corresponding to the electricity utility company) an outstanding bill for $100 that is owed to the electricity utility company. The transaction rendering module 108 may render a prompt 302 on the display screen indicating an amount owed to the party. The prompt 302 may indicate options for the user to either send a payment (e.g., send payment button 304) to the electricity utility company or to set a reminder for a future payment (e.g., remind me later button 306).

FIG. 3B shows another example GUI 310 comprising information rendered by the transaction rendering module 108, in accordance with one or more example arrangements. The GUI 310 may be displayed, for example, if the user selects the payments button 210 or selects the request payment button 252-2 during an ongoing call. In an example, the GUI 310 may be displayed automatically during the call without any user input. For example, during an ongoing call with a contact, the predictive caching module may determine (e.g., based on scanning text messages between the user and the contact and/or based on prior transactions) that the user is owed $10 by the contact. The transaction rendering module 108 may render a prompt 312 on the display screen indicating the amount owed to the user. The prompt 312 may further indicate options for the user to either request the payment (e.g., request payment button 314) from the contact or to set a reminder (e.g., remind me later button 316).

Figures 3C, 3D:
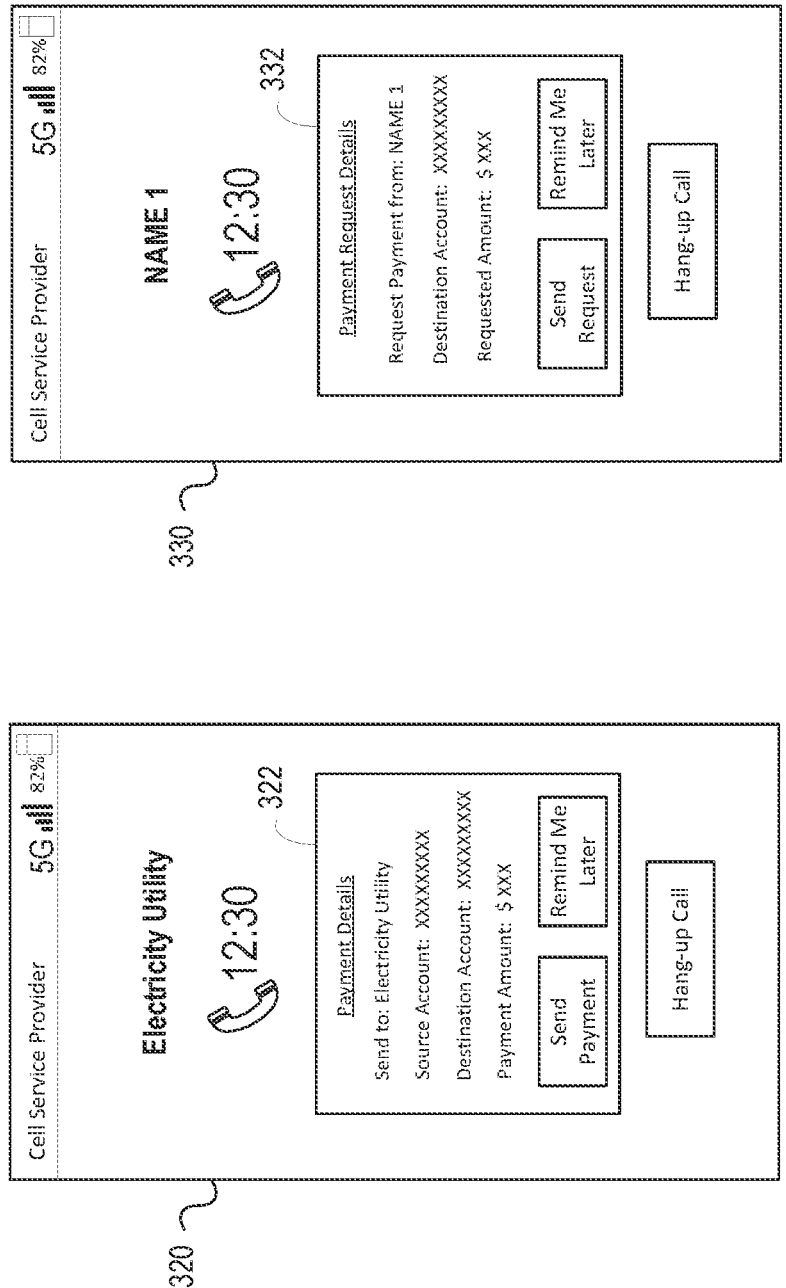

FIG. 3C shows another example GUI 320 comprising information rendered by the transaction rendering module 108, in accordance with one or more example arrangements. The GUI 320 may be displayed, for example, based on considerations described above with reference to the GUI 300. The transaction rendering module 108 may render a prompt 322 on the display screen indicating the value of the payment transaction, a source account number, a destination account number, etc. The user may be able to edit the information indicated in the prompt 322 by selecting the prompt 322 and entering the edits using an on-screen keyboard that may be rendered on the GUI 320. The prompt 322 may indicate options for the user to either send the payment to the electricity utility company or to set a reminder for a future payment.

FIG. 3D shows another example GUI 330 comprising information rendered by the transaction rendering module 108, in accordance with one or more example arrangements. The GUI 330 may be displayed, for example, based on considerations described above with reference to the GUI 310. The transaction rendering module 108 may render a prompt 332 on the display screen indicating the value of the payment transaction, the source account number, the destination account number, etc. The user may be able to edit the information indicated in the prompt 332. The prompt may indicate options for the user to either request the payment from the contact or to set a reminder.

At step 124, the transaction rendering module 108 may send a payment memo to a payment initiation component 110 based on user confirmation of the payment transaction. For example, the transaction rendering module may send the payment memo if the user selects the send payment button or a send request button (e.g., as rendered on the GUIs described above with reference to FIGS. 3A-3D). The payment memo may comprise the determined payment information (e.g., which may have been edited by the user via the GUIs). The payment memo may further comprise an indication whether a payment is being sent to the party, or a payment is being requested from the party. The payment initiation component 110 may be associated with the payment processing application (e.g., the application corresponding to the bank, a money transfer service provider, etc.).

In an arrangement, the application may be activated on the mobile device 100. Since the user may have been authenticated at step 118, activation of the application may not trigger a request for user authentication. An appropriate GUI in the application, for the payment transaction, may be displayed. Various entries on the screen may be pre-filled based on the payment memo. The user may edit the payment transaction and/or confirm the payment transaction by selecting an appropriate button on the screen.

At step 126, the payment initiation component 110 may send, to a payment server 112, a transaction request. The payment server 112 may be associated with the bank or the money transfer service provider. The transaction request may comprise the payment information. The payment server may process the payment to the party (e.g., from a source account associated with the user to a destination account associated with the party) based on the payment information. Alternatively, if the transaction request is to request a payment from the party, the payment server may send a request for payment to the party based on the payment information.

The payment server may send a confirmation message to the wireless device if a payment has been transferred from/to the party, and/or if a request for payment has been successfully sent to the party via the payment server 112. The confirmation message may comprise one or more of a value of the transfer, the source account information, the destination account information, identifying information associated with the party, an indication that a request for payment has been successfully sent to the party, etc. The mobile device 100 may store information corresponding to the confirmation message in the transaction history database.

Additionally, or alternatively, the transaction rendering module 108 may send, to an alert module 114 (e.g., associated with the bank or the money transfer service provider), reminder information. In an example, the payment server 112 may comprise the alert module 114. The reminder information may correspond to a request for a reminder of the payment transaction. For example, the transaction rendering module may send the reminder information if the user selects the remind me later button (e.g., as rendered on the GUIs described above with reference to FIGS. 3A-3D). The reminder information may comprise the payment information and a time/date at which the reminder is to be sent to the user and/or the party regarding a pending payment transaction. The alert module 114 may send, to the mobile device 100, reminder information corresponding to the payment transaction at the specified time/date. Additionally, or alternatively, the reminder information may be shared with an alerts/reminders module on the mobile device 100. The alerts/reminders module may set an alert using a calendar application on the mobile device 100.

In an arrangement, one or more of the steps described with reference to FIG. 1 may be omitted, may be performed in a different order, and/or may be performed by a different module/component. For example, the payment analyzer component 106 need not authenticate the user as described above with respect to step 118 (e.g., if the user has already input the authenticating information to unlock the mobile device 100). As another example, the payment initiation component 110 may authenticate the user when sending the transaction request at step 126.

In an arrangement, steps performed by two or more of the modules/components as described above may be performed by a single module/component. For example, the payment analyzer component 106 may perform operations described above with reference to the transaction rendering module 108.

Figure 4:
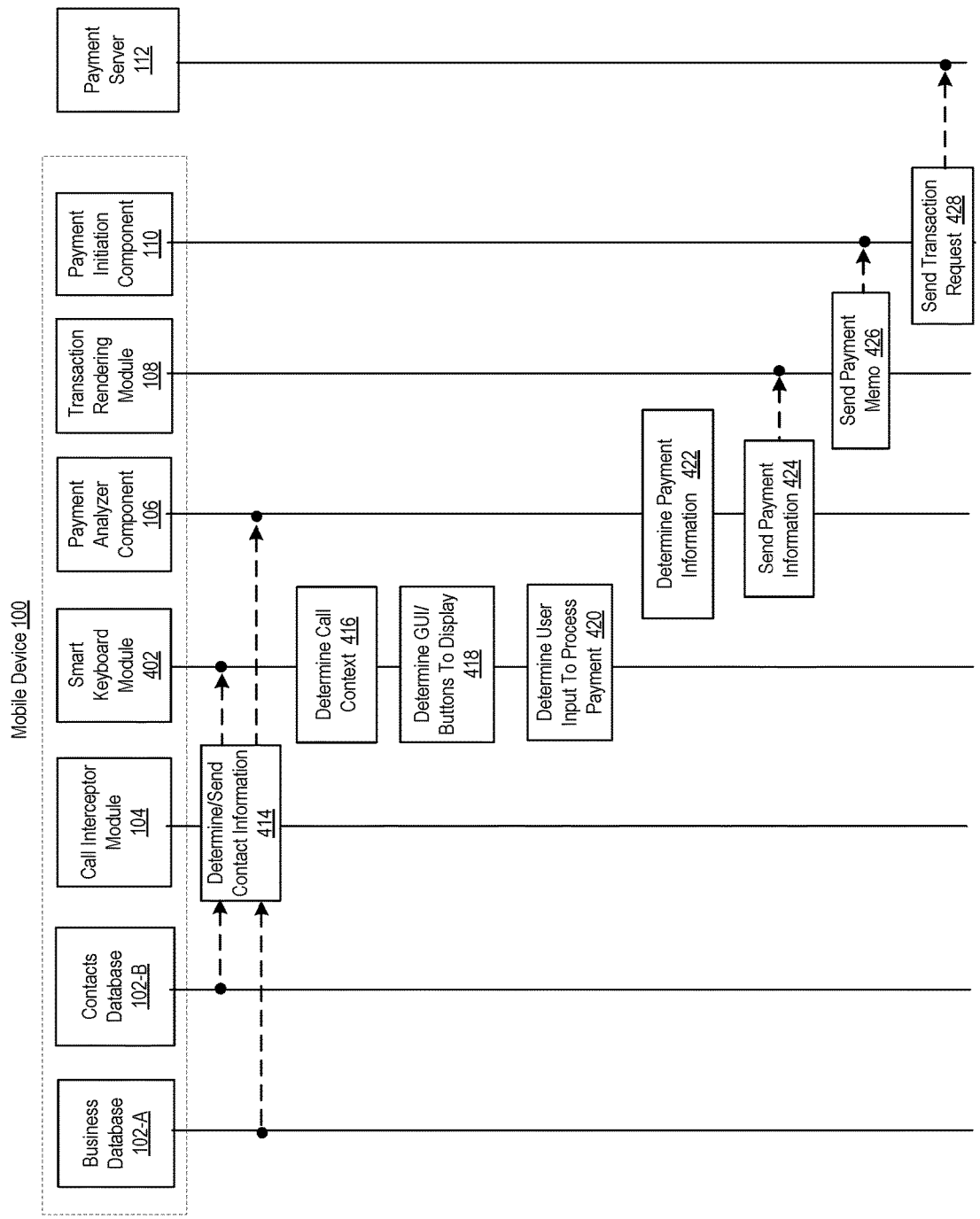
FIG. 4 shows an illustrative event sequence for rendering virtual buttons based on call context, in accordance with one or more example arrangements.

FIG. 4 shows an illustrative event sequence for rendering virtual buttons based on call context, in accordance with one or more example arrangements. The virtual buttons may correspond to a virtual keyboard rendered for display during an ongoing call.

At step 414, a call interceptor module 104 on the mobile device 100 may determine, based on an incoming call from (or an outgoing call to) a party, contact information associated with the party. For example, the call interceptor module 104 may determine a number (e.g., cellphone number, telephone number) associated with the party and access a database 102 to determine, based on the number, contact information associated with the party. The contact information may comprise identifying information (e.g., a name) associated with the party. In an example, the call interceptor module 104 may determine that the party is not associated with any contact information stored in the database 102.

At step 416, a smart keyboard module 402 may determine a call context associated with the ongoing call. Determining the call context may comprise determining whether an ongoing call conversation relates to a payment transaction, determining whether the party is associated with contact information stored in the database 102, determining a date/time associated with the ongoing call, determining whether the party may be known to user, etc. The smart keyboard module 402 may comprise (or interact with) one or both of a speech-to-text conversion module and a natural language processing module to determine the call context. For example, the speech-to-text conversion module may convert call audio to text, and the natural language processing module may perform processing operations on the converted call audio to determine the call context. In an example, the natural language processing module may comprise an integrated speech-to-text conversion module.

At step 418, the smart keyboard module 402 may determine a GUI and/or buttons to display based on the determined call context. Certain trigger words may be used to determine a call context. For example, based on detecting words related to payments or money transfer (e.g., "I owe you," "send money," "utility bill is due"), the smart keyboard module 402 may determine that a call conversation relates to a payment transaction between the party and the user. The smart keyboard module 402 may, based on this determination, determine a GUI (e.g., the GUI 202 with the payments button 210, or the GUI with buttons 252 for various payment options) for display. In another example, the smart keyboard module 402 may determine a GUI (e.g., the GUI 202 with the payments button 210, or the GUI 250 with buttons 252 for various payment options) for display based on determining that the call conversation relates to a payment transaction, the party is associated with contact information stored in the database 102, and/or information corresponding to the party is present in the payments directory associated with the payment processing application. If the smart keyboard module 402 determines that the call is not related to a payment transaction and/or if the party is not associated with any contact information stored in the database 102, a default GUI, which does not comprise buttons corresponding to payments related functions, may be displayed.

At step 420, the smart keyboard module 402 may determine a user input to process the payment transaction. For example, the smart keyboard module 402 may determine that the user has pressed the payments button 210 in the GUI 202 (as shown in FIG. 2A) or one of the buttons 252 in the GUI 250 (e.g., as shown in FIG. 2B). Based on the user input, the payment analyzer component 106, the transaction rendering module 108, and/or the payment initiation component 110 may perform the steps 422-428. Steps 422-428 may be similar or substantially similar to the steps 122-126 described above with reference to FIG. 1.

Figures 5A, 5B:
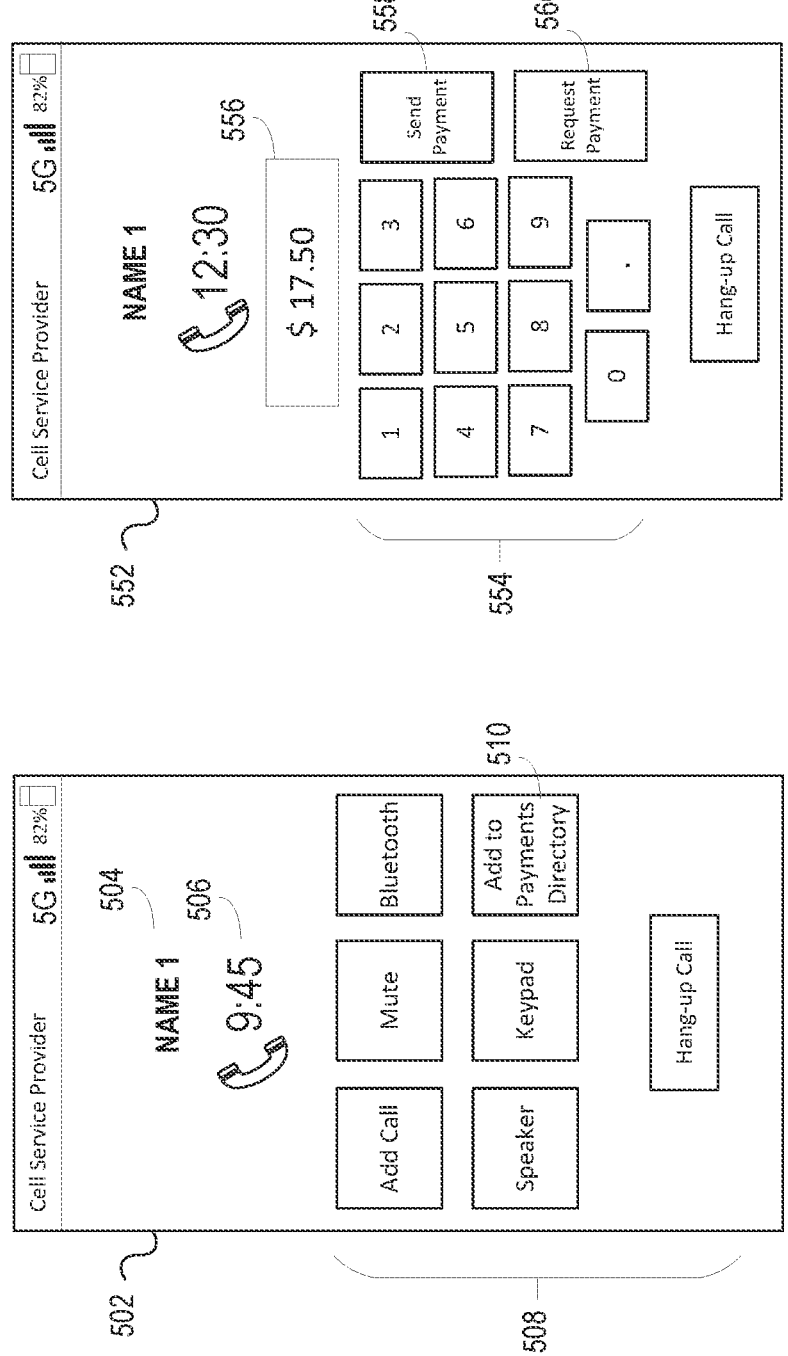
FIGS. 5A and 5B shows illustrative GUIs that may be presented during an ongoing call, in accordance with one or more example arrangements.

FIG. 5A shows an example GUI 502 that may be presented on a display screen of the mobile device 100 during an ongoing telephone call. The GUI 502 may display identifying information 504 associated with a party with which a user is currently on call. The GUI 502 may further display other call information 506 (e.g., a call timer) and buttons 508 corresponding to various call functions. The GUI 502 may comprise one or more buttons determined, by the smart keyboard module 402, based on a call context.

The smart keyboard module 402 may determine that a call conversation between the party ("Name 1") and the user relates to a payment transaction between the party and the user. For example, using the natural language processing module, the smart keyboard module 402 may detect words related to payments or money transfer (e.g., "I owe you," "please send money"). The smart keyboard module 402 may further determine if information corresponding to the party is present in the payments directory associated with the payment processing application. The smart keyboard module 402 may determine to display an add to payments directory button 510 based on determining that the call conversation relates to payment transaction and/or based on determining that payments directory does not comprise information corresponding to the party. If the user selects the add to payments directory button 510, information associated with the party (e.g., a cellphone number corresponding to the party, a name of the party) may be added to the payments directory (e.g., without any further user input). Alternatively, the user may be directed to a GUI in which the user may input the information corresponding to the party.

FIG. 5B shows an example GUI 552 that may be presented on a display screen of the mobile device 100 during an ongoing telephone call. Based on considerations described above with reference to FIGS. 4 and 5A, the smart keyboard module 402 may determine that a call conversation between the party and the user relates to a payment transaction. The GUI 552 may be presented based on determining that the call conversation between the party and the user relates to a payment transaction. The GUI 552 may comprise one or more of an indication 556 of a value of the payment transaction, a keypad 554 that may be used to input a transaction value, a send payment button 558, and/or a request payment button 560. If the user selects the send payment button 558 or the request payment button 560, the smart keyboard module may send the inputted transaction value to the transaction rendering module 108 and/or the payment initiation component 110 for initiating the payment transaction. The transaction rendering module 108 and/or the payment initiation component 110 may perform one or more operations described with reference to FIG. 1. For example, the payment initiation component 110 may send, to the payment server 112, a transaction request comprising the inputted transaction value.

The smart keyboard module 104 may be used for operations other than payment transactions. FIG. 6A shows an example GUI 602 that may be presented on a display screen of the mobile device 100 during an ongoing telephone call. The call interceptor module 104 may determine that a call is with a party for which contact information is not stored in the database 102. As a result, the GUI 602 may comprise an unknown caller indication 604.

The smart keyboard module 402 may determine a call context and determine that the party may be known to the user. For example, using the natural language processing module, the smart keyboard module 402 may detect words/phrases related to familiarity between the party and the user (e.g., "its been a long time," "how are you"). The smart keyboard module 402 may additionally, or alternatively, determine that the party may be known to the user based on determining that a call duration exceeds a threshold call duration. Based on determining that the party may be known to the user, the smart keyboard module 402 may determine to display an add to contacts button 606 on the GUI 602. If the user selects the add to payments directory button 606, the user may be directed to a GUI in which the user may input information corresponding to the party (e.g., a name corresponding to the party). For example, the user may be directed to a GUI associated with an application that maintains the contacts database 102-1.

FIG. 6B shows an example GUI 652 that may be presented on a display screen of the mobile device 100 during an ongoing telephone call. The smart keyboard module 402 may determine a call context and may determine that the call is associated with setting up an appointment. For example, using the natural language processing module, the smart keyboard module 402 may detect words/phrases related to setting up a time and/or to perform a specific action at a particular time (e.g., "lets meet at the coffee shop," "I will call you tomorrow"). Based on determining that the call is associated with setting up an appointment, the smart keyboard module 402 may display a prompt 654 comprising appointment information. The appointment information may comprise information that may be determined by the natural language processing module. If the user selects a set appointment button 656 included in the prompt 654, the appointment information may be added to an appointments database maintained by a calendar application on the mobile device 100.

One or more of the buttons included in various GUIs described herein may be deeplink-enabled buttons that may direct the user to specific interfaces within an application. For example, the payments button 210, the send payment button 252-2, the request payment button 252-2, the send payment button 558, and/or the request payment button 560 may direct the user to an interface in the payment processing application, thereby enabling the user to confirm a payment transaction. The add to payments directory button 510 may direct the user to an interface in the payment processing application, enabling the user to input information (e.g., an account number, an email address) corresponding to a party. The add to contacts button 606 may direct the user to an interface in an application that maintains the contacts database 102-1. One or more fields in the interfaces may be pre-filed based on information determined by the payment analyzer component 106, the smart keyboard module 402, the natural language processing module, etc. For example, the interface in the payment processing application may comprise payment information determined by the payment analyzer component 106.

Figure 7:
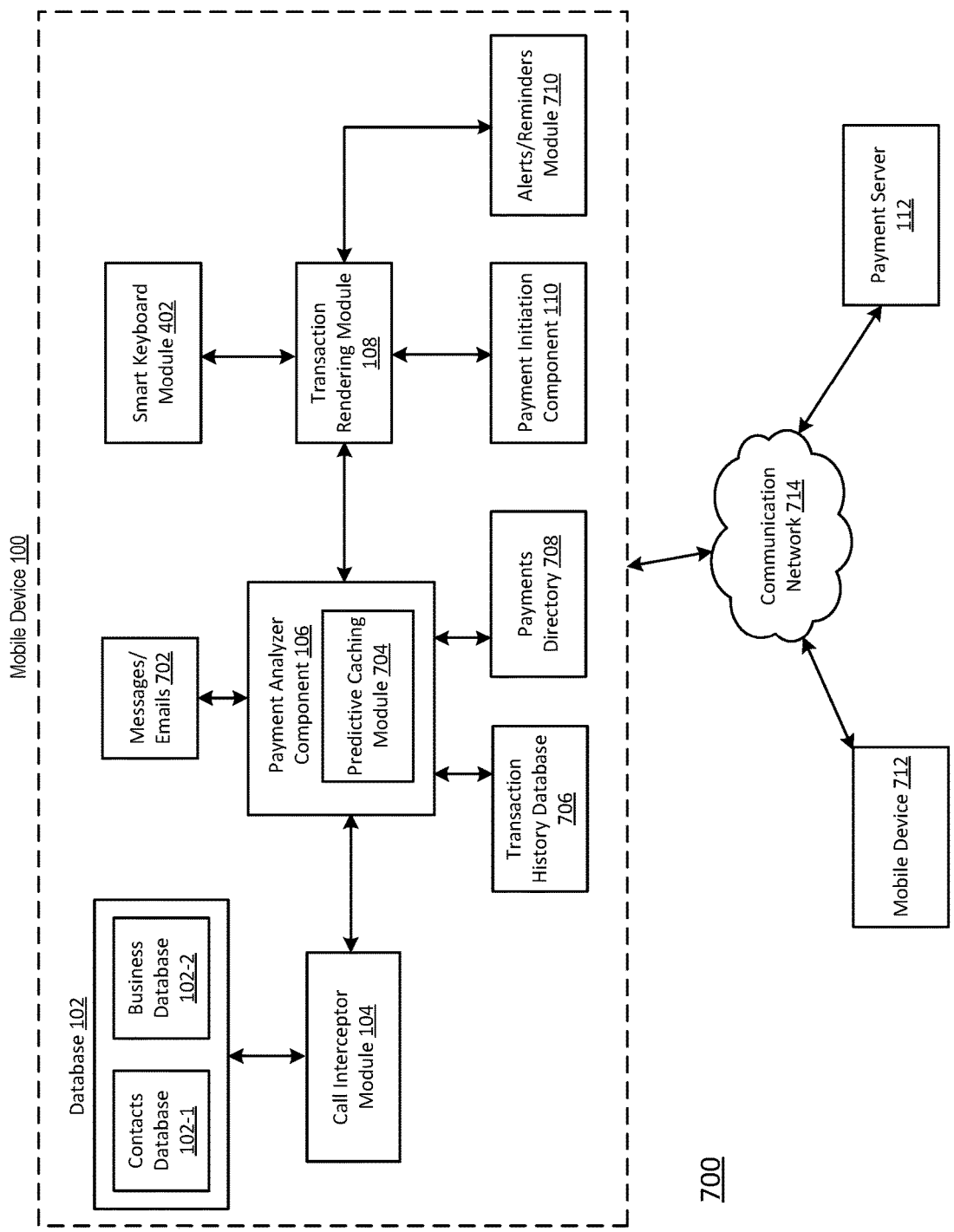
FIG. 7 shows an illustrative computing environment, in accordance with one or more example arrangements.

FIG. 7 depicts an illustrative computing environment 700, in accordance with one or more example arrangements. The computing environment 700 may comprise one or more devices (e.g., computer systems, communication devices, etc.). The computing environment 500 may comprise, for example, a plurality of mobile devices (e.g., the mobile device 102 associated with a user and a mobile device 712 associated with another party), the payment server 112, and/or the like. One or more of the devices and/or systems, may be linked over a communication network 714 (e.g., a cellular communication network). The communication network 714 may use wired and/or wireless communication protocols.

Various components, modules, and/or databases in the mobile device 100 may exchange/share information using software interfaces and perform various operations described herein. The mobile device 100 and the mobile device 712 may be in an ongoing call. The call interceptor module 104 may determine contact information corresponding to the mobile device 712 using information stored in the contacts database 102 and/or the business database. The payment analyzer component 106 (and/or a predictive caching module 704) may use the determined contact information to access messages/emails 702, a transaction history database 706, and a payments directory 708 to determine payment information (e.g., one or more of a user name associated with the party, an email address associated with the party, source account number associated with the user, destination account number associated with the party, a routing number associated with a bank, a value of the payment transaction, an indication of whether a payment is owed to the party or whether a payment is being requested from the party, etc.). The transaction rendering module 108 may render the determined payment information on a GUI. The GUI may further comprise one or more buttons determined by the smart keyboard module 402 (e.g., a send money button, a request money button, and/or other buttons described with reference to GUIs described with reference to FIGS. 2A, 2B, 3A-3D, 5A, 5B, 6A, 6B, etc.). Based on user confirmation of a payment transaction, the payment initiation component 110 may send a transaction request to the payment server 112. In another example, based on a user input, the mobile device 100 may store reminder information corresponding to the payment transaction using an alerts/reminders module 710.

The payment server 112 may comprise one or more computing devices and/or other computer components (e.g., processors, memories, communication interfaces). The payment server 112 may be configured to process a payment transaction between the user associated with the mobile device 100 and the party associated with the mobile device 712. For example, the payment server may be linked to one or more servers/databases storing information associated with a source account and a destination account, and process a payment transaction between the source account and the destination account.

Figure 8:
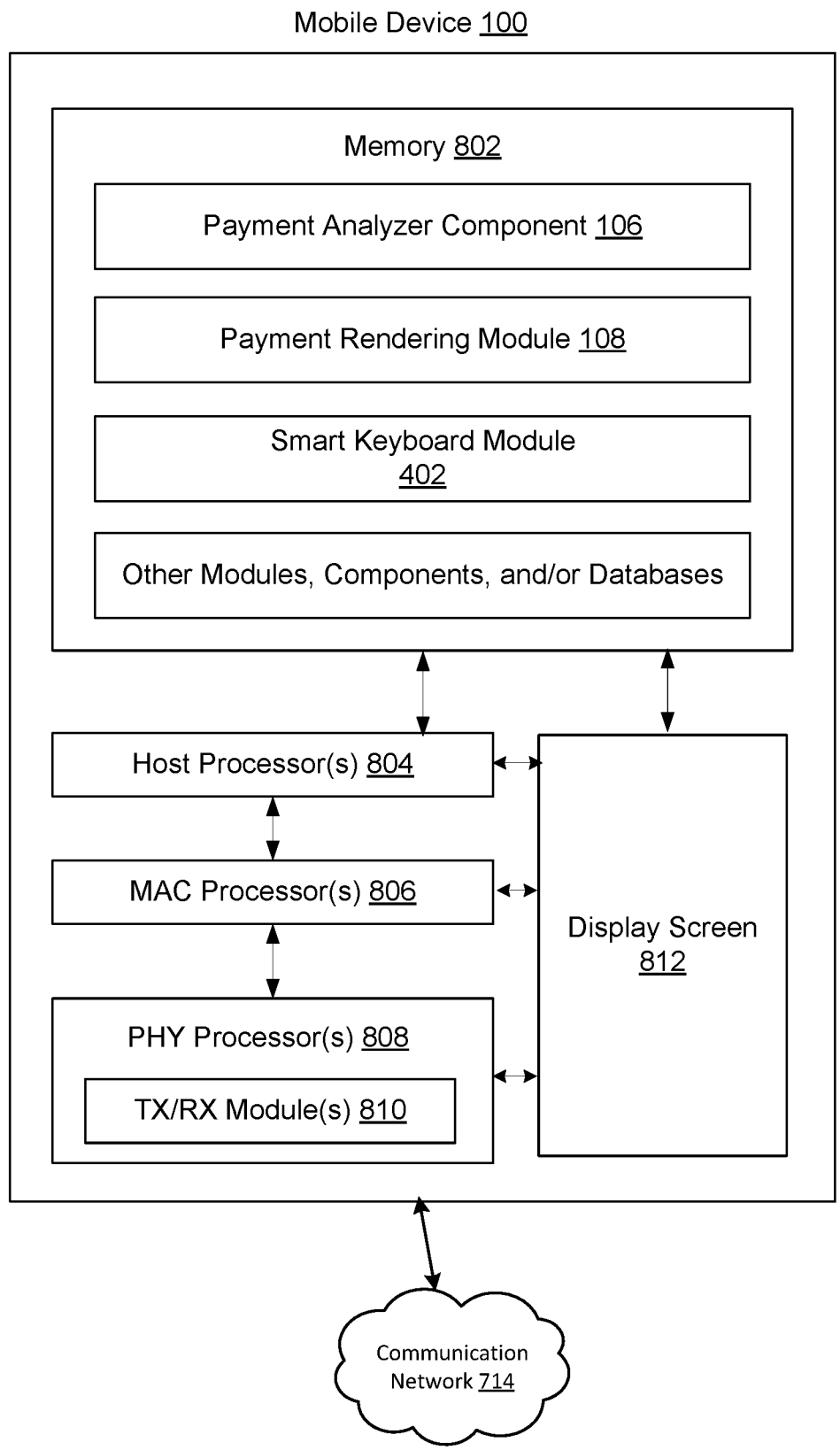
FIG. 8 shows an illustrative mobile device, in accordance with one or more arrangements.

FIG. 8 shows an example mobile device 100 in accordance with one or more arrangements. The mobile device 100 may comprise one or more of host processor(s) 804, medium transaction control (MAC) processor(s) 806, physical layer (PHY) processor(s) 808, transmit/receive (TX/RX) module(s) 810, memory 802, a display screen 812, and/or the like. One or more data buses may interconnect the host processor(s) 804, the MAC processor(s) 806, the PHY processor(s) 808, the Tx/Rx module(s) 810, the display screen 812, and/or the memory 802. The mobile device 100 may be implemented using one or more integrated circuits (ICs), software, or a combination thereof, configured to operate as discussed below. The host processor(s) 804, the MAC processor(s) 806, and the PHY processor(s) 808 may be implemented, at least partially, on a single IC or multiple ICs. The memory 802 may be any memory such as a random-access memory (RAM), a read-only memory (ROM), a flash memory, or any other electronically readable memory, or the like.

Messages transmitted from and received at devices in the computing environment 700 may be encoded in one or more MAC data units and/or PHY data units. For example, the MAC processor(s) 806 and/or the PHY processor(s) 804 of the IOT-enabled module 111 are configured to generate data units, and process received data units, that conform to any suitable wired and/or wireless communication protocol. For example, the MAC processor(s) 806 may be configured to implement MAC layer functions, and the PHY processor(s) 808 may be configured to implement PHY layer functions corresponding to the communication protocol. The MAC processor(s) 806 may, for example, generate MAC data units (e.g., MAC protocol data units (MPDUs)), and forward the MAC data units to the PHY processor(s) 808. The PHY processor(s) 808 may, for example, generate PHY data units (e.g., PHY protocol data units (PPDUs)) based on the MAC data units. The generated PHY data units may be transmitted via the TX/RX module(s) 810 over the communication network 714. Similarly, the PHY processor(s) 808 may receive PHY data units from the TX/RX module(s) 714, extract MAC data units encapsulated within the PHY data units, and forward the extracted MAC data units to the MAC processor(s). The MAC processor(s) 806 may then process the MAC data units as forwarded by the PHY processor(s) 808.

One or more processors (e.g., the host processor(s) 804, the MAC processor(s) 806, the PHY processor(s) 808, and/or the like) of the mobile device 100 may be configured to execute machine readable instructions stored in memory 802. The memory 802 may comprise (i) one or more program modules/engines having instructions that when executed by the one or more processors cause the mobile device 100 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the mobile device 100 and/or by different computing devices that may form and/or otherwise make up the mobile device 100. For example, memory 802 may have, store, and/or comprise the payment analyzer component 106, the payment rendering module 108, the smart keyboard module 402, the predictive caching module 704, the call interceptor module 104, the payment initiation component 110, the alerts/reminders module 710, a display driver, various databases (e.g., the database 102, the transaction history database 706, the messages/emails database 702, the payments directory 708) and/or the like.

Figure 9:
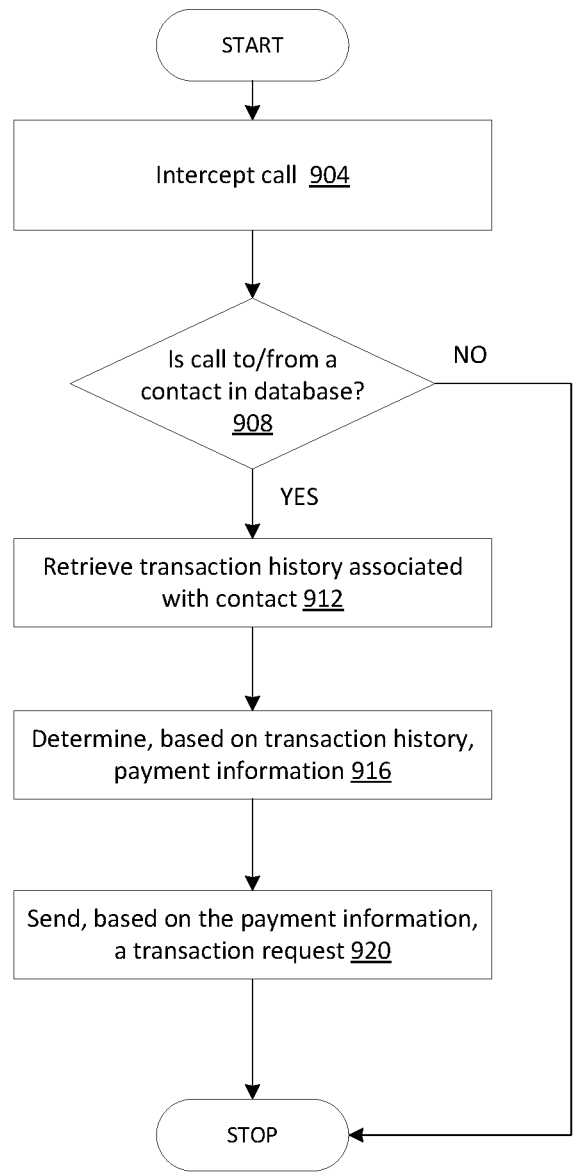
FIG. 9 shows an illustrative algorithm for a payment transaction, in accordance with one or more example arrangements.

FIG. 9 shows an illustrative algorithm for a payment transaction, in accordance with one or more example arrangements. The illustrative algorithm may be used at a wireless device to send a transaction request to the payment server 112. At step 904, the mobile device 100 (e.g., the call interceptor module 104 in the wireless device) may intercept a call to determine if the call is from/to a party for which contact information stored in database 102. For example, the call interceptor module 104 may determine a cellphone number (e.g., cellphone number or telephone number) associated with the party and access the database 102 to determine (e.g., at step 908), based on the number, whether contact information associated with the party is stored in the database 102.

At step 912, if contact information associated with the party is stored in the database 102, the mobile device 100 (e.g., the payment analyzer component 106) may determine, based on the contact information, transaction history associated with the party. The transaction history may comprise prior payments made to the party, prior payments received from the party, prior payment requests to/from the party, etc.

At step 916, the mobile device 100 (e.g., a predictive caching module associated with the payment analyzer component 106) may determine payment information based on the transaction history. The payment information may comprise, for example, a value of a payment transaction between the party and a user associated with mobile device 100. The mobile device 100 (e.g., the transaction rendering module 108) may display the payment information on a display screen associated with the mobile device 100.

At step 920, the mobile device 100 (e.g., the payment initiation component 110) may send, to the payment server, a transaction request, for example, based on user input confirming a payment transaction. The transaction request may comprise the determined payment information.

Figure 10:
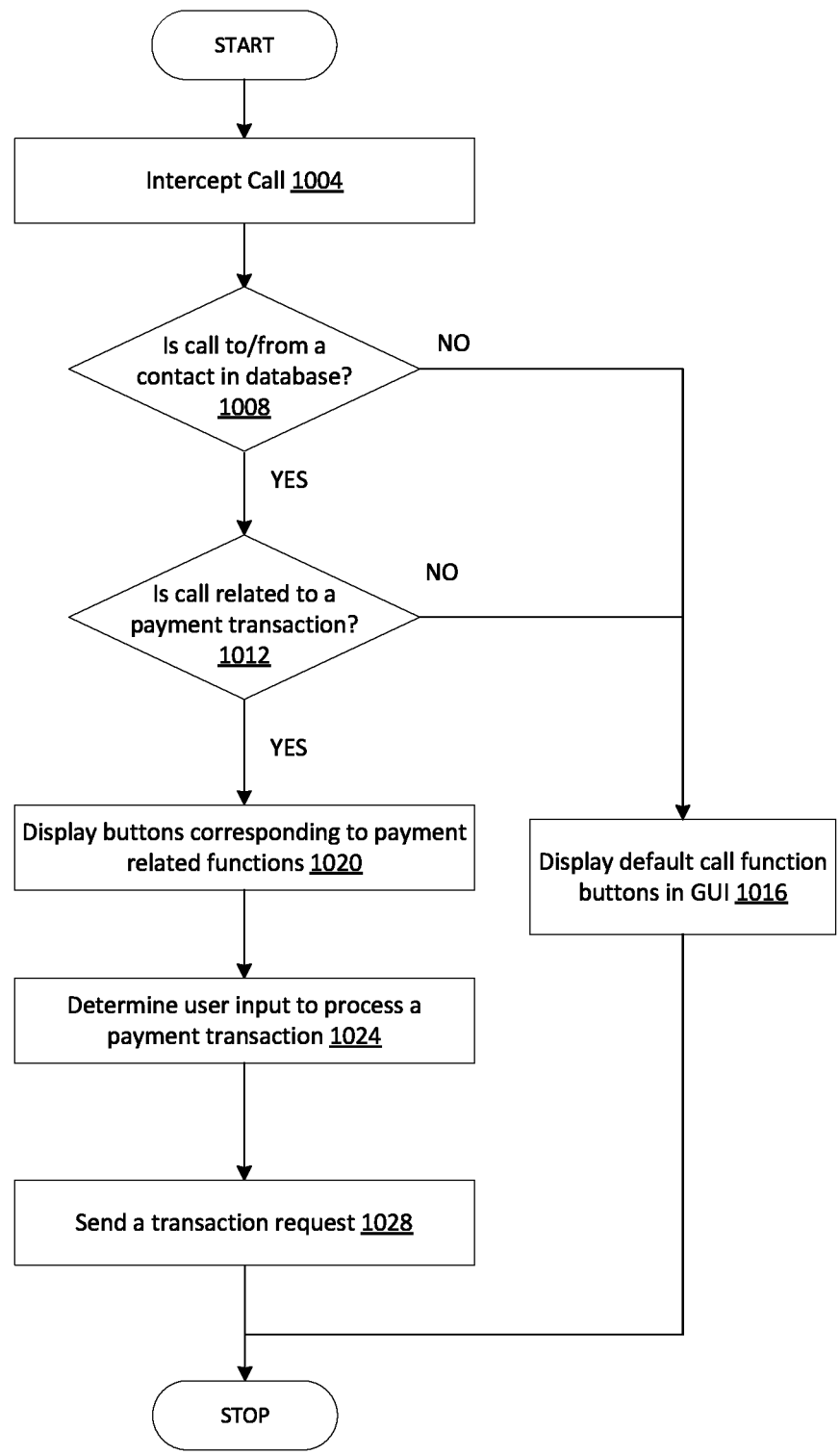
FIG. 10 shows an illustrative algorithm for rendering virtual buttons on the mobile device for a payment transaction, in accordance with one or more example arrangements.

FIG. 10 shows an illustrative algorithm for rendering virtual buttons on the mobile device 100 for a payment transaction, in accordance with one or more example arrangements. The rendered virtual buttons may correspond to payment transaction-related functions at the mobile device 100. At step 1004, the mobile device 100 (e.g., the call interceptor module 104 in the wireless device) may intercept a call to determine if the call is from/to a party for which contact information stored in database 102. For example, the call interceptor module 104 may determine a cellphone number (e.g., cellphone number or telephone number) associated with the party and access the database 102 to determine (e.g., at step 1008), based on the number, whether contact information associated with the party is stored in the database 102.

If contact information associated with the party is not stored in the database 102, at step 1016, the mobile device 100 (e.g., the smart keyboard module 402) may determine a default GUI for display on the display screen 812. The default GUI may not comprise buttons corresponding to payments related functions and may only comprise default call function buttons (e.g., an add call button, a mute button, a Bluetooth button, a speaker button, etc.)

If the contact information associated with the party is stored in the database 102, at step 1012, the mobile device 100 (e.g., the smart keyboard module 402) may determine whether the call is related to a payment transaction. For example, the smart keyboard module 104 may use a natural language processing module to determine if a call conversation comprises keywords related to payments or money transfer. If the call is not related to a payment transaction, at step 1016, the mobile device 100 (e.g., the smart keyboard module 402) may determine the default GUI for display on the display screen 812. If the call is related to a payment transaction, at step 1020, the mobile device 100 (e.g., the smart keyboard module 402) may determine a GUI for display on the display screen 812, wherein the GUI may comprise, in addition to the default call function buttons, buttons corresponding to payment related functions (e.g., send payment, request payment, etc.).

At step 1024, the mobile device 100 (e.g., the smart keyboard module 402) may determine a user input to process a payment transaction. The smart keyboard module may determine, for example, that the user has selected a button corresponding to a payment related function.

At step 1028, the mobile device 100 (e.g., the payment initiation component 110) may send, to the payment server, a transaction request, for example, based on user input confirming a payment transaction. The transaction request may comprise the payment information determined by the payment analyzer component 106 and/or by the user.

Various arrangements described herein enable efficient initiation of a payment transaction by a user during a call. For example, the user may select payment options using buttons displayed on a GUI associated with the call, without opening and accessing a specific payment processing application. A payment analyzer component in the mobile device may automatically determine various details associated with the payment transaction. A smart keyboard module may flexibly generate a GUI with on-screen buttons for payment operations and/or other mobile device functions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A payment processing system, the system comprising:
   a mobile device, associated with a first user, comprising at least one first processor, a first communication interface communicatively coupled to the at least one first processor, and a first memory storing first computer-readable instructions that, when executed by the at least one first processor, cause the mobile device to:
      determine, during an ongoing call with a second user, a call context associated with the ongoing call, determining the call context associated with the ongoing call including:

converting, via a speech-to-text conversion component on the mobile device, call audio of the ongoing call to text; and processing, via a natural language processing component on the mobile device, the text from the converted call audio to detect one or more keywords indicating the call context of the ongoing call;

determine, based on the call context, whether the ongoing call is related to a payment;

responsive to determining, based on the call context, that the ongoing call is related to a payment:

determine, based on the call context, a first user interface including a first plurality of virtual keyboard buttons to display on a display screen associated with the mobile device, the first plurality of virtual keyboard buttons including a payment button;

display, during the ongoing call, the determined first user interface including the first plurality of virtual keyboard buttons;

determine a user input, received via the payment button of the first plurality of virtual keyboard buttons, to process a payment transaction;

send, via the first communication interface to a payment server, a transaction request to process the payment transaction;

responsive to determining, based on the call context, that the ongoing call is not related to a payment:

determine a second user interface, the second user interface including a second plurality of virtual keyboard buttons that does not include the payment button; and display, during the ongoing call, the second user interface including the second plurality of virtual keyboard buttons;

and the payment server comprising at least one second processor, a second communication interface communicatively coupled to the at least one second processor, and a second memory storing second computer-readable instructions that, when executed by the at least one second processor, cause the payment server to:

receive, via the second communication interface, the transaction request.

2. The system of claim 1, wherein the first computer-readable instructions that, when executed by the at least one first processor, cause the mobile device to:

determine, during the ongoing call with the second user, contact information associated with the second user; and determine, based on the contact information, the transaction request.

3. The system of claim 2, wherein the first computer-readable instructions that, when executed by the at least one first processor, cause the mobile device to:

determine, based on the contact information, payment information, wherein the payment information comprises at least one of:
source account information,
destination account information,
a transaction value, and
combinations thereof;
wherein the transaction request comprises the payment information.

4. The system of claim 3, wherein the first computer-readable instructions, when executed by the at least one first processor, causes the mobile device to:

display, during the ongoing call and on the display screen of the mobile device, the determined payment information, wherein the sending the transaction request comprises receiving a user confirmation to send the transaction request.

5. The system of claim 3, wherein the first computer-readable instructions, when executed by the at least one first processor, causes the mobile device to:

determine, based on the contact information, a transaction history between the first user and the second user; and determine, based on the transaction history, the transaction value.

6. The system of claim 5, wherein the transaction history comprises transaction values corresponding to prior transaction requests between the first user and the second user.

7. The system of claim 3, wherein the determining the payment information comprises authenticating a user of the mobile device based on at least one of:
a password;
a passcode;
a biometric identity; and
combinations thereof.

8. The system of claim 3, wherein the determining the payment information comprises analyzing prior communications between the first user and the second user.

9. The system of claim 1, wherein the first computer-readable instructions, when executed by the at least one first processor, causes the mobile device to:

receive, from the payment server, a confirmation message indicating that a transaction corresponding to the transaction request has been processed.

10. A method at a mobile device associated with a first user, the method comprising:

determining, by a mobile device having at least one processor and memory, and during an ongoing call with a second user, a call context associated with the ongoing call, determining the call context associated with the ongoing call including:

converting, by the mobile device via a speech-to-text conversion component on the mobile device, call audio of the ongoing call to text; and processing, by the mobile device via a natural language processing component on the mobile device, the text from the converted call audio to detect one or more keywords indicating the call context of the ongoing call;

determining, by the mobile device and based on the call context, whether the ongoing call is related to a payment;

responsive to determining, based on the call context, that the ongoing call is related to a payment:

determining, by the mobile device and based on the call context, a first user interface including a first plurality of virtual keyboard buttons to display on a display screen associated with the mobile device, the first plurality of virtual keyboard buttons including a payment button;

displaying, by the mobile device and during the ongoing call, the determined first user interface including the first plurality of virtual keyboard buttons;

determining, by the mobile device, a user input, received via the payment button of the first plurality of virtual keyboard buttons, to process a payment transaction;

sending, by the mobile device and to a payment server, a transaction request to process the payment transaction;
responsive to determining, based on the call context, that the ongoing call is not related to a payment:
determining, by the mobile device, a second user interface, the second user interface including a second plurality of virtual keyboard buttons that does not include the payment button; and
displaying, by the mobile device and during the ongoing call, the second user interface including the second plurality of virtual keyboard buttons.

11. The method of claim 10, further comprising:
determining, by the mobile device and during the ongoing call with the second user, contact information associated with the second user; and
determining, by the mobile device and based on the contact information, the transaction request.

12. The method of claim 11, further comprising:
determining, by the mobile device and based on the contact information, payment information, wherein the payment information comprises at least one of:
source account information,
destination account information,
a transaction value, and
combinations thereof;
wherein the transaction request comprises the payment information.

13. The method of claim 12, further comprising:
displaying, by the mobile device and during the ongoing call and on the display screen, the determined payment information, wherein the sending the transaction request comprises receiving a user confirmation to send the transaction request.

14. The method of claim 12, further comprising:
determining, by the mobile device and based on the contact information, a transaction history between the first user and the second user; and
determining, by the mobile device and based on the transaction history, the transaction value.

15. The method of claim 10, further comprising receiving, by the mobile device and from the payment server, a confirmation message indicating that a transaction corresponding to the transaction request has been processed.

16. An apparatus comprising:
at least one processor;
a communication interface communicatively coupled to the at least one processor; and
a memory storing computer-readable instructions that, when executed by the at least one processor, cause the apparatus to:
determine, during an ongoing call with a user, a call context associated with the ongoing call, determining the call context associated with the ongoing call including:
converting, via a speech-to-text conversion component on the apparatus, call audio of the ongoing call to text; and
processing, via a natural language processing component on the apparatus, the text from the converted call audio to detect one or more keywords indicating the call context of the ongoing call;
determine, based on the call context, whether the ongoing call is related to a payment;
responsive to determining, based on the call context, that the ongoing call is related to a payment:
determine, based on the call context, a first user interface including a first plurality of virtual keyboard buttons to display on a display screen associated with the apparatus, the first plurality of virtual keyboard buttons including a payment button;
display, during the ongoing call, the determined first user interface including the first plurality of virtual keyboard buttons;
determine a user input, received via the payment button of the first plurality of virtual keyboard buttons, to process a payment transaction;
send, via the communication interface to a payment server, a transaction request to process the payment transaction;
responsive to determining, based on the call context, that the ongoing call is not related to a payment:
determine a second user interface, the second user interface including a second plurality of virtual keyboard buttons that does not include the payment button; and
display, during the ongoing call, the second user interface including the second plurality of virtual keyboard buttons.

* * * * *